Jan. 27, 1931. A. W. SIEGLAFF 1,790,329
AIRPLANE WING STABILIZER
Filed March 5, 1930 2 Sheets-Sheet 2
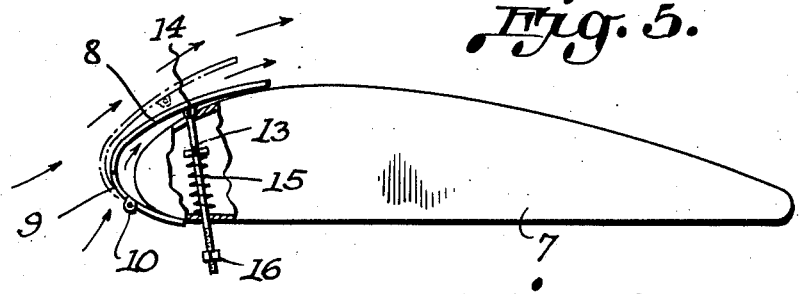
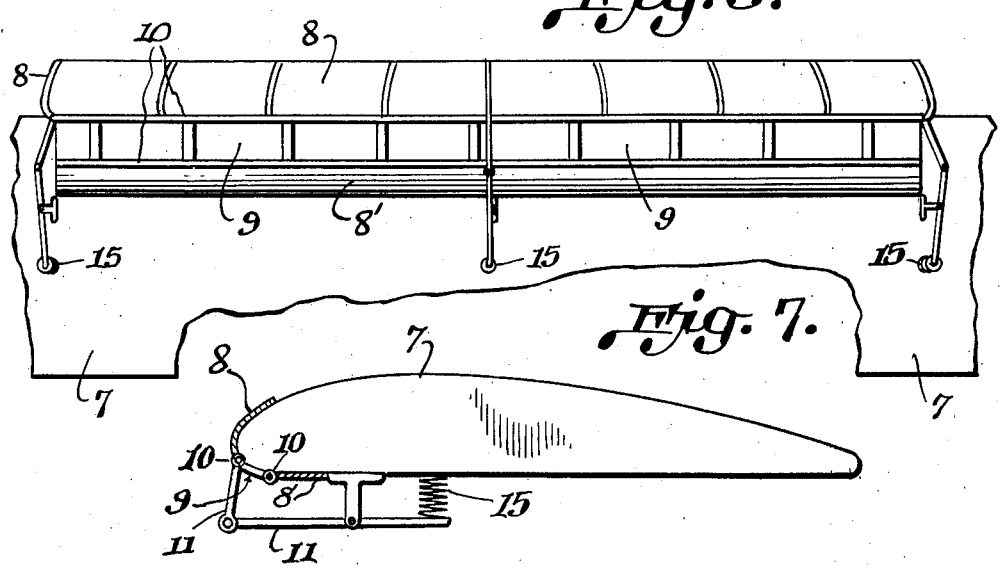
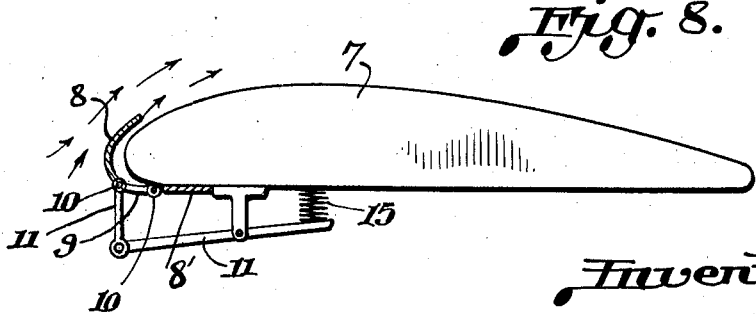

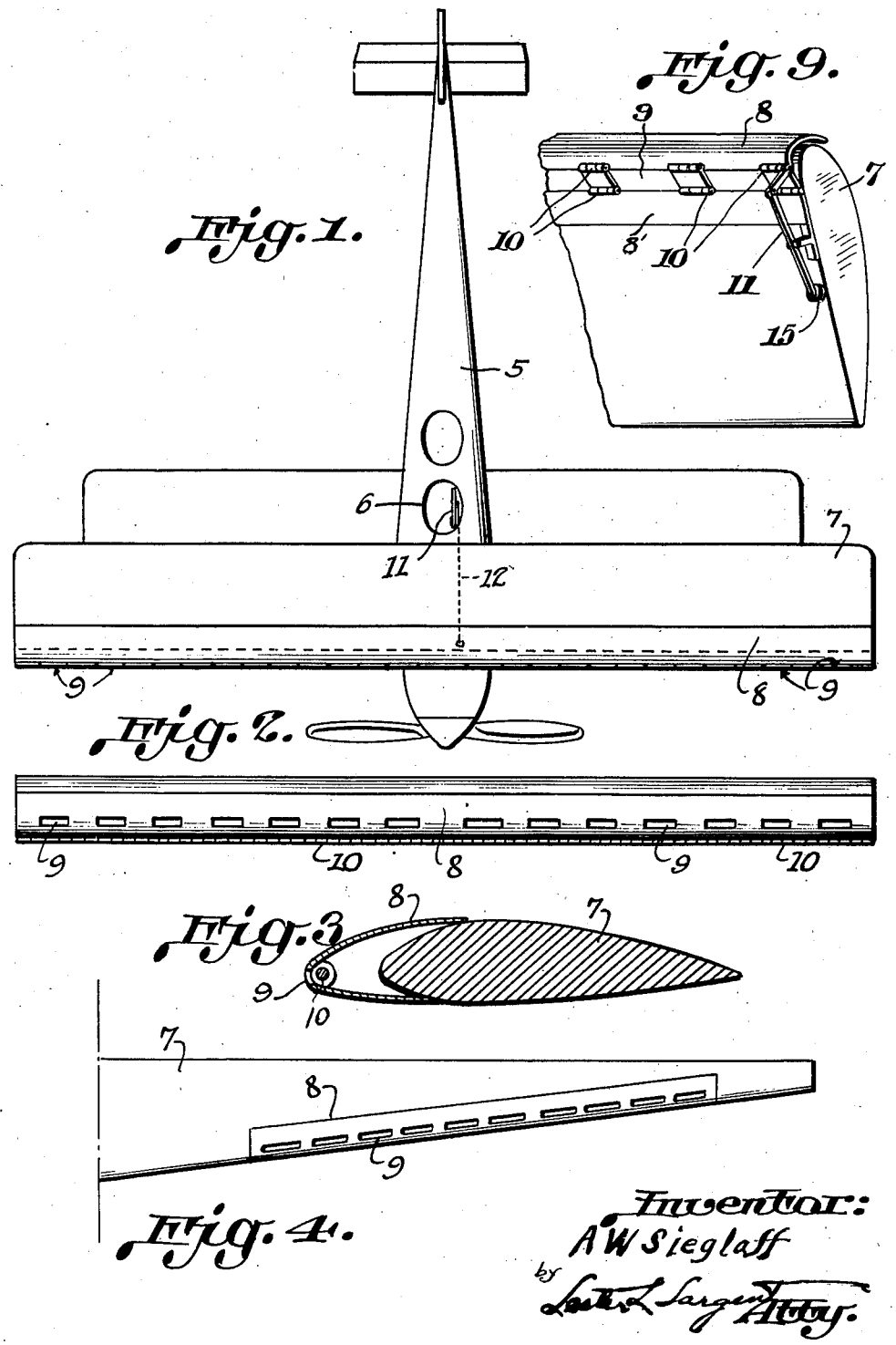
Jan. 27, 1931. A. W. SIEGLAFF 1,790,329
AIRPLANE WING STABILIZER
Filed March 5, 1930 2 Sheets-Sheet 1

Patented Jan. 27, 1931

1,790,329

UNITED STATES PATENT OFFICE

ARTHUR W. SIEGLAFF, OF MILWAUKEE, WISCONSIN

AIRPLANE-WING STABILIZER

Application filed March 5, 1930. Serial No. 433,399.

The object of my invention is to provide a novel airplane wing stabilizer which will create a new airfoil and prevent airplanes from going into tail spins, will reduce their landing speed and increase their lift at a low speed.

It is also an object of my invention to provide novel means for operating such an airplane wing stabilizer, and to provide the novel combination and arrangement of parts disclosed in the accompanying drawings and hereinafter described.

I attain these and other objects of my invention by the means illustrated in the accompanying drawings, in which,—

Figure 1 is a top plan view of my invention applied to an airplane;

Fig. 2 is a longitudinal section through the shutter 8;
Fig. 3 is a transverse section through an airplane wing having my novel stabilizer;

Fig. 4 is an enlarged detail view of the shutter;

Fig. 5 is a view partly in elevation and partly in section of an airplane wing to which the shutter is applied with a modified means for adjusting same;

Fig. 6 is a front elevation of the form of the invention illustrated in Figs. 7 and 8.
Fig. 7 is a view partly in section and partly in elevation of another modification of the invention; and Fig. 8 is a similar view with the shutter in a different operative position.
Fig. 9 is a view in perspective of the arrangement of parts in Fig. 8.

Like numerals designate like parts in each of the several views.

Referring to Figure 1 of the drawings, there is illustrated an airplane fuselage 5 having the conventional cockpit 6 and airplane wing 7. Mounted on the forward surface of the wing is a shutter 8, arcuate in cross section to conform with the usual streamline construction. This shutter 8 is provided with a series of spaced vents 9, as shown in Fig. 2. The shutter 8 is hinged at 10 as illustrated in the drawings.

Referring to Fig. 5, I may provide a rod 13 hinged at 14 to the shutter 8 and having a coil spring 15 arranged to limit the outward movement of the shutter. I also may provide a suitable nut or nuts 16 on the threaded end of the rod 13 for regulating the range of movement of the rod and consequently of the shutter.

In Figs. 6, 7 and 8, there is illustrated a modification of the invention in which a contractile spring 15 is interposed between the arm or control rod 11 of the shutter 8 and the under side of the airplane wing and having a function similar to that of spring 15 in Fig. 5. The shutter 8 is connected with its base 8' by a double hinge 10 as shown in Figs. 8 and 9.

When the shutter or stabilizer 8 is open, the vents 9 will open as the ship travels and air is deflected to a more vertical position, as indicated by the arrows, gradually sloping to the rear of the wing and creating a greater vacuum. The vents are for the sole purpose of allowing a certain amount of air to hit the nose of the wing, drifting upward and removing the vacuum that might be created by the shutter and wing otherwise.

The vents will be regulated to allow the proper amount of air so as not to interfere with the lift.

I may provide any suitable means for controlling the shutter, such as automatic hand control, control by a small electric motor, or air pressure or hydraulic operation.

When the shutter is closed it fits snugly to the metal base that is fastened to the nose of the entire length of the wing, so that by the shutter fitting snugly the vents are closed and there is no interference with the functioning of the general air currents of the ship's original design. This shutter is operated by a control rod 11 mounted on a suitable bracket and is controlled by a spring which has an adjusting nut. As the airship slows down the pressure against the air current is not as great, the spring expands and the shutter opens. The metal base of the shutter is held in place in any suitable manner as by a clamp over the rib that is built onto the wing (not shown).

In the forwardly tapered shutter attachment illustrated in Figs. 1–4 of the drawings, the taper or streamline contour decreases the resistance and thus in effect, besides varying the lift, increases the speed of the straight wing plane and is adaptable to adjustment to any type of airplane. The shutter is operated on a double hinge 10 which is fastened to the base and to the shutter. The forward taper of this shutter sharpens the nose of the wing, and being on a slant allows the air flow to travel quicker over the ship without decreasing the lift. With the shutter open you still maintain a little of the speed, yet increasing the lift.

The shutter may be placed over the entire length of the ship, or only part of same, or on as many wings as may be desired. The vents may be made of any suitable size and shape.

In the forms of the invention illustrated in Figs. 6, 7 and 8, the method of operating is substantially the same as that of the form shown in Fig. 5, the contractile spring 15 being differently disposed but having a similar function and the shutter being controlled by any suitable means, such as automatic hand control, electric motor, air pressure or hydraulic pressure.

What I claim is:

1. An airplane wing-stabilizer, comprising a shutter arcuate in cross section suitably adapted to be secured to the nose of an airplane wing, said shutter having a series of spaced vents for permitting a certain amount of air to hit the nose of the wing and drift upward to increase the lift by creating a new air foil.

2. In an airplane wing stabilizer, the combination of a shutter of streamline construction adapted to be secured to the nose of an airplane wing, said shutter having a series of spaced vents for permitting a certain amount of air to hit the nose of the wing and drift upward to increase the lift by creating a new air foil, a hinge mounting for the shutter, and spring controlled means for automatically regulating the position of the shutter relative to the upper surface of the airplane wing to regulate the amount of air current passing under the shutter.

3. In an airplane wing stabilizer, the combination of a shutter of streamline construction adapted to be secured to the nose of an airplane wing, said shutter having a series of spaced vents for permitting a certain amount of air to hit the nose of the wing and drift upward to increase the lift by creating a new air foil, a hinged mounting for the shutter and means for regulating the movement of the shutter.

4. In an airplane wing stabilizer, the combination of a shutter of streamline construction adapted to be secured to the nose of an airplane wing, said shutter having a series of spaced vents for permitting a certain amount of air to hit the nose of the wing and drift upward to increase the lift by creating a new air foil, a hinged mounting for the shutter, and spring controlled means for regulating the position of the shutter relative to the upper surface of the airplane wing to regulate the amount of air current passing under the shutter.

ARTHUR W. SIEGLAFF.